Sept. 25, 1934.  B. J. VICTOR  1,974,633
GASKET
Filed July 23, 1930

Inventor
Benjamin J. Victor
By Wm. O. Bell
Atty.

Patented Sept. 25, 1934

1,974,633

UNITED STATES PATENT OFFICE 1,974,633

GASKET

Benjamin J. Victor, Oak Park, Ill., assignor to Victor Manufacturing & Gasket Company, Chicago, Ill., a corporation of Illinois Application July 23, 1930, Serial No. 470,058

1 Claim. (Cl. 288—1)

This invention relates to gaskets and it has for its object to provide a gasket of simple construction which can be economically made up in substantially any form now employed in gasket manufacture.

Further objects are to provide a comparatively inexpensive gasket which will have sufficient stability to hold its shape during ordinary conditions of shipping, handling and use; to bind the edges of the port openings of the gasket by single or united flanges to protect the edges of these openings; to form an efficient bearing surface and seal and to further reenforce the gasket; and to protect the outer surfaces of the heat-resisting material embodied in the gasket and to further reenforce the gasket and make it stronger and more substantial where such conditions are required.

In the accompanying drawing I have illustrated the invention in a simple embodiment and referring thereto, Fig. 1 shows a cylinder head gasket embodying my invention.

Figure 1:
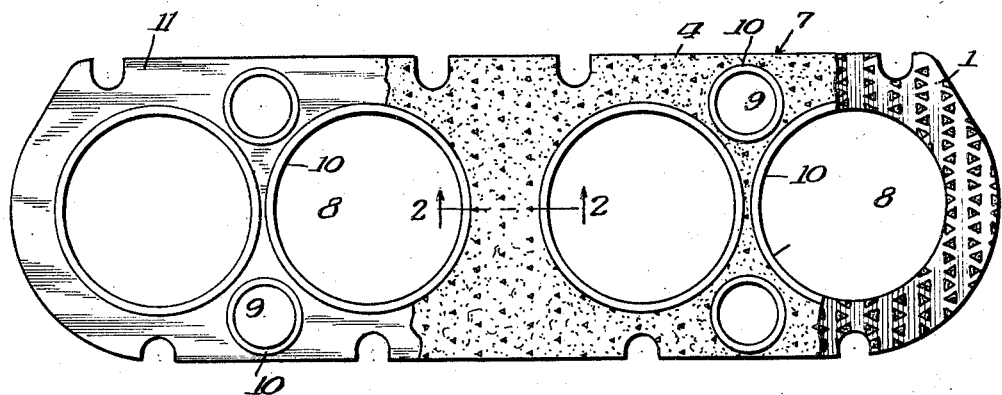
Figure 2:
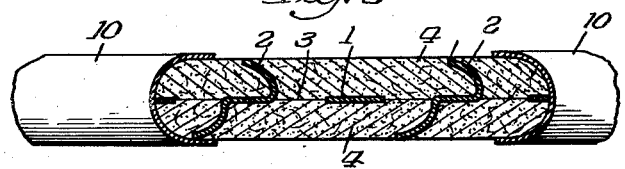
Fig. 2 is a sectional view on the line 2—2 of Fig. 1.
Figure 3:
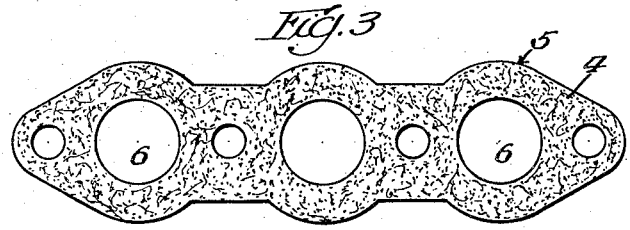
Fig. 3 is a plan view of an exhaust manifold gasket.
Figure 4:
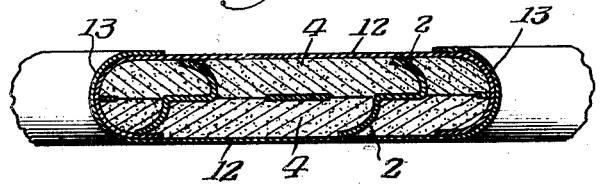
Fig. 4 is a sectional view similar to Fig. 2 but showing another embodiment of the invention.

The gasket comprises a core 1 having a plurality of prongs 2 struck up on opposite sides thereof leaving openings 3 and clenched upon layers 4, 4 of heat-resisting material applied to the sides of the core and forming a rigid, compact and substantial structure with the layers anchored to the core against relative movement. The prongs 2 are bent in the same direction to clenchingly engage and hold the layers on the core and the points of the prongs are depressed within the layers at least sufficiently to prevent them from projecting above the surfaces of the layers so that these surfaces will be smooth and unobstructed and also so that the gasket may yield sufficiently under the pressure of tightening the joint to which it is applied to provide an efficient seal. A gasket as described is satisfactory for use for some purposes such as an exhaust manifold gasket 5 having ports 6; and its use may be considerably extended under favorable conditions. Such gaskets should have their exposed surfaces graphited in the usual manner. But for cylinder head and similar gaskets and particularly those having water ports I consider it necessary to protect the edges of the ports to prevent leakage. In Fig. 1 I have shown a cylinder head gasket 7 having cylinder ports 8 and water ports 9, the edges of which are bound by flanges 10 which not only protect the edges of the ports but also co-operate with the core in providing a strong and rigid gasket. Such a gasket may have the exposed surfaces of heat-resisting material graphited or otherwise protected by waterproof coating or a facing of tin or other foil 11 and in some cases, especially for high compression engines, I prefer to cover the exposed surfaces of the heat-resisting layers with metal layers 12, Fig. 4, which can be held in place by separate flanges 10, or by united flanges, or the flanges may be formed on the layers 12 and overlapped as at 13, Fig. 4. The core is preferably made of steel but it can be made of copper or other metal or of any other material suitable for the purpose. The heat-resisting material is preferably asbestos or asbestos composition but it also may be made of any material suitable for the purpose. The core covered with the heat-resisting material secured thereon by the clenching prongs forms a gasket by itself which can be used for exhaust manifolds and for other purposes but I prefer that such gaskets should have the edges of the port openings bound by flanges not only to protect the edges and assist in forming an efficient seal but also to add strength and rigidity to the gasket which may be made of core material with comparatively little strength. These gaskets should, of course, be graphited in a manner familiar in the art to afford a measure of waterproof protection, but for a better class of gasket I prefer to cover the outer surfaces of the gasket with tin foil or some other waterproofing and protective material; and where the conditions require a still better gasket I prefer to apply metal covering layers to the outer surfaces of the gasket and to hold them in place by the flanges at the ports. While I prefer that the gasket should have heat-resisting layers on both sides there may be uses for a gasket having a heat-resisting layer on one side only and in this event the core will be provided with prongs on one side only to clench the single layer of heat-resisting material. It is important, of course, that each heat-resisting layer should be rigidly and securely anchored upon the core so that there can be no relative movement at any time and so that the layer may not become loosened and damaged in handling or in shipping. The prongs are stamped from the core and they are desirably triangular in shape with their points projecting outwardly, practically the entire prong being embedded in the heat-resisting layer and clenched therein. A part of the prong may show through the surface of the gasket but this is not important provided it does not project above the surface.

My invention provides for the economical manufacture of gaskets in different forms to meet the requirements of use and I reserve the right to make all such changes in the form, construction and arrangement of parts which may be necessary or desirable to adapt the invention for different gaskets which are now or may hereafter be required, or otherwise, within the scope of the following claim:

I claim:

A gasket having openings therein and comprising layers of gasket material and a reenforcing core interposed between said layers, said core consisting of a metal sheet having arcuate prongs stamped therefrom and projecting outwardly from both sides thereof and wholly embedded in said layers, said prongs all being bent into clenching engagement with the layers to secure the layers upon the core throughout the area of the gasket, and flanges extending through the openings and overlapping the marginal edges of the gasket at said openings to protect said edges and to cooperate with said prongs to prevent relative lateral movement of the layers and core and to prevent separation of the layers from the core and to cooperate with said core to reenforce and strengthen the gasket, some of the prongs overhanging the perforations formed by stamping the prongs from the metal sheet and some of the prongs overhanging the metal of the sheet between said perforations.

BENJAMIN J. VICTOR.